United States Patent [19]

Kuchuk-Yatsenko et al.

[11] 4,217,478
[45] Aug. 12, 1980

[54] DEVICE FOR CONTROLLING BUTT WELDING MACHINE

[76] Inventors: Sergei I. Kuchuk-Yatsenko, Ulitsa Filatova 1/22, Kv. 47; Valery G. Krivenko, Ulitsa Ordzhonikidze 3, Kv. 35; Ivan K. Golomovzjuk, Ulitsa Vetryanaya 28, Kv. 1, all of Kiev, U.S.S.R.

[21] Appl. No.: 963,827
[22] Filed: Nov. 27, 1978

Related U.S. Application Data

[63] Continuation-in-part of Ser. No. 714,173, Aug. 13, 1977, abandoned.

[30] Foreign Application Priority Data

Oct. 8, 1975 [SU] U.S.S.R. .............................. 2178895

[51] Int. Cl.² ............................................. B23K 11/04
[52] U.S. Cl. ................................... 219/97; 219/101
[58] Field of Search ................................. 219/97, 101

[56] References Cited

U.S. PATENT DOCUMENTS

| 2,877,337 | 3/1957 | Evans | 219/97 |
| 3,002,082 | 9/1961 | Sheer | 219/97 |
| 3,036,202 | 5/1962 | Stieglitz et al. | 219/97 |
| 3,036,204 | 5/1962 | Stieglitz et al. | 219/101 |
| 3,349,216 | 10/1967 | Paton et al. | 219/101 |
| 3,978,746 | 9/1976 | Kuchuk-Yatsenko et al. | 83/914 |

Primary Examiner—B. A. Reynolds
Assistant Examiner—Clifford C. Shaw
Attorney, Agent, or Firm—Lackenbach, Lilling & Siegel

[57] ABSTRACT

A device for controlling a butt welding machine includes a pressure equalizing hydraulic slide valve connected to a manifold between the rod space of a clamping hydraulic cylinder and a reversible hydraulic slide valve coupled to both the delivery and drain manifolds of a hydraulic fluid supply system. Upon upsetting, the rod space communicates through the pressure equalizing hydraulic slide valve with the drain manifold, providing the same pressure above and beneath the piston and releasing a part of the clamping force. Provision is made for a programmed control unit or timer for energizing electromagnets adapted for switching the pressure equalizing hydraulic slide valve and a follow-up or tracking slide valve of a hydraulic drive adapted for carrying welded parts.

10 Claims, 2 Drawing Figures

DEVICE FOR CONTROLLING BUTT WELDING MACHINE

CROSS-REFERENCE TO RELATED APPLICATION

This application is a continuation-in-part application of application Ser. No. 714,173, now abandoned filed on Aug. 13, 1977 for "DEVICE FOR CONTROLLING BUT WELDING MACHINE."

BACKGROUND OF THE INVENTION

The present invention generally relates to welding and particularly to scissor-type resistance butt welding machines.

Known in the art is a device for controlling the operation of a rail welding machine. The device includes hydraulic cylinders for clamping two welded rails in two pairs of machine jaws each mounted on one of two machine's pillars, a transfer hydraulic drive, a hydraulic fluid supply system and a control system ("Equipment for Resistance Welding of Rails and its Operation" edited by Kuchuk-Yatsenko S. I., Kiev, 1974, p. 52). When one of the machine pillars includes flash trimming cutters emcompassing a rail along its entire perimeter (USSR Application No. 2027967/25-27, July 26, 1974), the prior art circuit controlling the release of the jaws and machine transfer does not provide for the possibility of selectively releasing a rail web by one pair of jaws mounted on the same pillar on which the cutters are mounted while keeping the other pair of jaws clamped, and does not allow the subsequent accelerated advance of the machine pillar with the cutters mounted thereon to remove the flash at the welded joint.

Also known in the art is a device for controlling the operation of a plier or scissor-type rail welding machine that is employed for welding rails together in situ. See, for example, U.S. Pat. No. 3,349,216. Such devices typically include two clamping hydraulic cylinders for clamping the welded rails in machine clamping jaws, each cylinder being associated with a pair of plier-type clamps interconnected by a common shaft and by the rods of two upset hydraulic cylinders, a hydraulic fluid supply system, an electrohydraulic transfer drive which includes a follow-up hydraulic slide valve and a reversible hydraulic slide valve controlling the clamping and unclamping of both welded rails only, however, simultaneously. Flash is sheared off the rails joined together on the machine by means of air chisels after the rails have been taken out of the welder and the latter has been carried aside. According to another embodiment, flash trimming is effected in special purpose gears disposed externally of the welding machine. As the welded rails are taken out of the welder and set up in the flash trimming gear, the joint cools off and the flash trimming operation thereby requires a considerable force to be applied.

A need for simultaneous clamping or releasing of both pairs of the plier-type clamps is dictated by the designs of the described prior art welding machines of the scissor-type which provide for alignment of the welded parts during welding. However, the machine design allows relieving one of the welded parts of the clamping force without appreciable release of the plier-type clamps.

In butt welding machines of the non-plier type adapted for operation under stationary conditions, each clamping cylinder is controlled individually with the aid of an individual hydraulic slide valve. Therefore, flash trimming in said machines can be effected without introducing any changes in the machine design by making use of the available machine control device.

The release of the jaws, mounted on the same movable pillar on which the cutters are mounted, is adjusted either by means of limit switches or visually.

However, on these machines accurate alignment of welded parts, rails in particular, poses a serious problem.

The plier welding machines are more mobile, enabling the rails or the entire lengths to be welded both under stationary and field conditions, directly in track, and ensuring automatic alignment of the welded rails.

To relieve the clamping force by any pair of clamping jaws it has been found to be sufficient to interconnect the rod space and the piston space of a corresponding clamping cylinder. In this case, the same pressure will be established in both spaces, the piston being carried upwards together with its rod, owing to a difference in its effective areas, and thereby separating the corresponding plier-type clamps. Both said spaces of the clamping cylinder can be connected simultaneously either to the drain or delivery manifold. In the first case a negligible pressure will be developed in said spaces and the piston with the clamping cylinder will be displaced a small distance releasing the clamping jaws without appreciable unclamping of said plier-type clamps, and the flash trimming cutters will be brought into a position minimizing the amount of the flash remaining upon its cutting off.

Where both said spaces of the clamping cylinder are connected to the delivery manifold, a rather great pressure will be established in said spaces, this resulting not only in relieving the clamping force but in appreciable releasing of said plier-type clamps. To preclude this it is necessary to mount a reduction valve, adjusted for a certain low operating pressure in each manifold connected to said clamping cylinder spaces which will make the design of said device more sophisticated and affect reliability thereof.

A device for removing flash after resistance butt welding of rails is described in U.S. Pat. No. 3,978,746. This patent discloses a plier or scissor-type rail welding machine which includes two spaced cases or pillars which are coupled to each other and made movable relative to each other by hydraulic cylinder arrangements. The patent discloses an arrangement of cutters mounted on one of the pillars or cases, which cutters are adapted to embrace the rail rolling surface, as well as the sides of the rail head, the web and the base flange of the rail. Initially, the rails are pinched or clamped inside each of the two spaced cases or pillars by a hydraulic cylinder. Once the welding process has been completed, one of the cases on which the cutters are mounted is moved by suitable hydraulic cylinders towards the welded joint to remove flash from it. Before the case or pillar with the cutters mounted thereon is set in motion, the clamped rail therein is partly released, but only enough to permit sliding of the rail, and only then is the flash removal operation started. This patent teaches the essential elements of a plier or scissor-type butt welding machine and describes the basic operation thereof. The present invention may be used in conjunction with a butt welding machine of the type disclosed in this patent to make the operation thereof more convenient and reliable.

SUMMARY OF THE INVENTION

The main object of the present invention is to provide a device for controlling a plier or scissor-type butt welding machine during flash trimming, said device being instrumental to provide a versatile machine ensuring the accomplishment on the same machine of completely mechanized operations involving the welding of parts, rails in particular, and flash trimming at the welded joint.

Another object of the invention is the provision of a device for controlling a butt welding machine during flash trimming, which device assures the versatility of the machine by making use of comparatively simple and inexpensive engineering means.

Still another object of the invention is to provide a device for controlling a butt welding machine which appreciably enhances both machine production rates and the quality of welded joints.

Yet another object of the invention is to provide a device for controlling welding machines, which results in a labor consuming flash trimming operation and improves working conditions in service.

The above and other objects are achieved by providing a device for controlling a butt welding machine during flash trimming, said machine comprising two pairs of plier or scissor-type clamps and upset hydraulic cylinders coupled with one of said plier-type clamps, each of said two pairs of plier-type clamps having a hydraulic cylinder for clamping machine jaws against parts to be welded. A hydraulic fluid supply system with delivery and drain manifolds is provided and connected to the spaces of a reversing hydraulic slide valve for simultaneously controlling the clamping and unclamping of both welded parts by controlling the hydraulic pressure within the spaces of said clamping hydraulic cylinders. A follow-up hydraulic slide valve is provided and connected to said manifolds and to said upset hydraulic cylinders and controlling coupling between said upset hydraulic cylinders and said manifolds to thereby control said upset hydraulic cylinders. Also provided is an electromechanical drive which is coupled to said follow-up hydraulic slide valve for actuating the same and thereby actuating said upset hydraulic cylinders during the welding process. Said electromechanical drive, said follow-up hydraulic slide valve and said upset hydraulic cylinders together forming an electro-hydraulic transfer drive; a device for flash trimming, following upset, comprising flash trimming cutters mounted on one of said pairs of said plier-type clamps to thereby move jointly therewith. Means are provided for controlling the machine following upset and during flash trimming which comprises a multiposition switch means coupled to said drain manifold and disposed between said reversing hydraulic slide valve and the rod space of that clamping hydraulic cylinder which is associated with a pair of said plier-type clamps fitted with flash trimming cutters so that in one of the positions said switch means substantially equalizes the pressures in both the rod and piston spaces of the respective clamping hydraulic cylinder, this resulting in a slight displacement of the rod of said clamping hydraulic cylinder and relieving one of the welded parts from the clamping force.

This embodiment of the invention enables the same conditions to be attained in both spaces of the clamping hydraulic cylinder. The clamping force applied to one of the welded parts is relieved automatically owing to a difference in effective piston areas in the rod and the piston spaces. Thus, the flash trimming operation can be effected with a minimum trimming allowance without considerable separation of said plier-type clamps.

According to one of the embodiments of the invention, a proposed device is characterized by a pressure equalizing hydraulic slide valve which acts as said multiposition switch gears, the rod space of said clamping cylinder being connected upon upsetting through said pressure equalizing hydraulic slide valve to the drain manifold, and control electromagnets are provided with the output of one of said electromagnets being connected with said pressure equalizing hydraulic slide valve in the course of operation, while the output of the other electromagnet is coupled with the inlet of said follow-up slide valve, the electromagnet inputs being connected to an electrical unit or timer controlling the actuation of said magnets according to a preset program.

The presently preferred embodiment allows the equalization of pressure in both spaces of the clamping hydraulic cylinder and synchronization of the functions of both the pressure equalizing and follow-up slide valves, and does not necessitate any material changes in the machine hydraulic system.

According to another embodiment of the invention, a device is proposed characterized in that the programmed unit for controlling said electromagnets is a master time control or electrical timer.

Said embodiment makes it possible to utilize a standard electrical master controller with several outputs for issuing commands for energizing the electromagnets according to the preset program.

The nature of the present invention will be better understood from a consideration of a detailed description of an exemplary embodiment thereof, to be had in conjunction with the accompanying drawings, in which:

DESCRIPTION OF A PREFERRED EMBODIMENT

Figure 1:
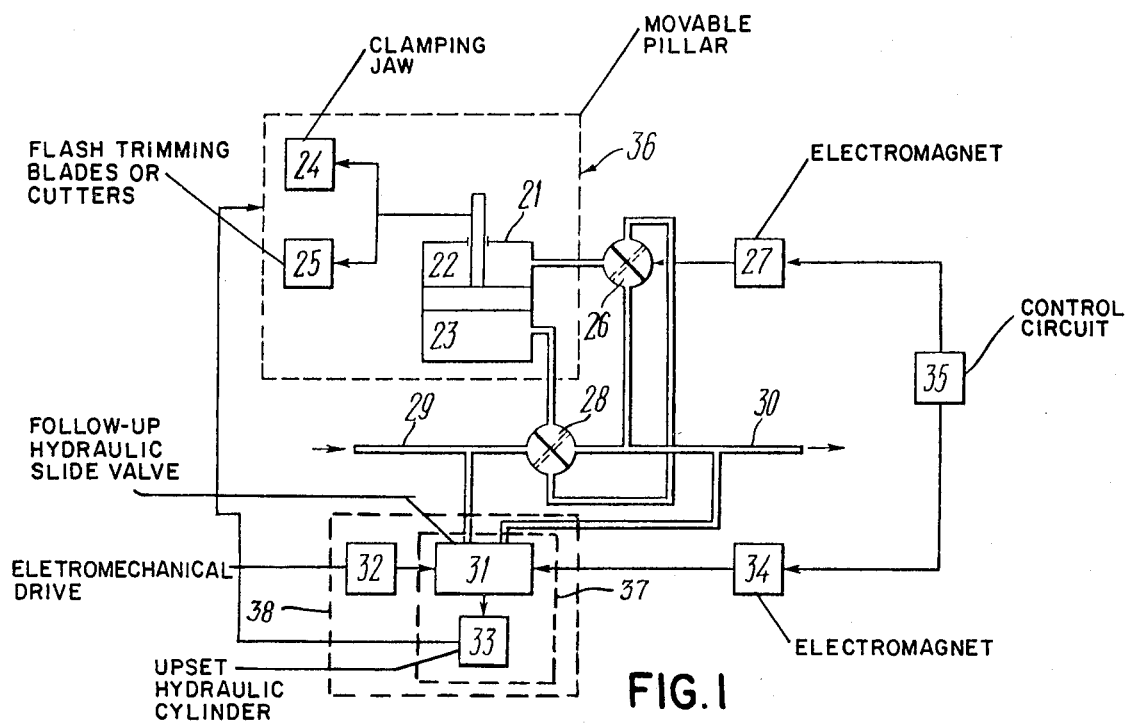
FIG. 1 is a block diagram of a device in accordance with the present invention for controlling a butt welding machine during flash trimming, the machine being shown in a position immediately after upsetting prior to issuing a command for cutters transfer to shear off flash.

A plier or scissor-type welding machine (not shown in the drawing) comprises two welding bodies interconnected by a common shaft and two rods of upset hydraulic cylinders. The plier or scissor-type welding machines in conjunction with which the present invention is intended to be used are well known to those skilled in the art, as described in the Background of the Invention. Accordingly, the details of such machines will not be described herein. However, reference is made to U.S. Pat. Nos. 3,349,216 and 3,978,746, as well as to the publication "Equipment of Resistance Welding of Rails and its Operation" edited by Kuchuk-Yatsenko, S. I., Kiev, 1974. These three aforementioned references establish the state of the prior art, and are incorporated herein to the extent that they teach the basic environment in which the improvement of the present invention may be placed.

Each of the bodies includes a pair of plier-type clamps mounted on the shaft. In each of the bodies the top portions of the clamps are articulated through links with a cross-arm, fixed on the rod of a corresponding clamping hydraulic cylinder mounted by means of a lug on the shaft. Secured at the bottom portion of the plier-type clamps are clamping jaws, one pair of the clamps mounting flash trimming cutters.

When the clamping cylinder rod is moved downwards, the links are brought into a position approximating horizontal by means of the cross-arm. In this case the top portions of the plier-type clamps are separated and the bottom portions with the jaws are brought together.

The flash trimming cutters (25 in FIG. 1) may include a top blade and two side cutters such as shown in U.S. Pat. No. 3,978,746. Cutting edges are made so as to form a profile of a rail in cross-section. The top cutter shears the flash off the top part of a rail head, whereas two side cutters shear the flash from its bottom part, a rail web and its base. When a rail is clamped in the machine jaws the cutters emcompass the rail along the entire perimeter thereof with a small clearance remaining therebetween, said clearance being necessary to preclude the jamming of the rail and is specified by rail dimensional working tolerances.

The clamping force acting on one of the parts can be released if the rod space of a corresponding cylinder communicates with the piston space thereof. In this case the same pressure is established in both spaces and owing to a difference in effective areas of the piston it will be brought upwards together with the rod, thereby ensuring separation of the corresponding plier-type clamps. Both said clamping cylinder spaces can simultaneously either be connected to the drain or the delivery manifolds. In the first case a small pressure will be developed in said cylinder spaces and the piston together with the clamping cylinder rod will be carried a short distance, thereby releasing a corresponding part being welded, or the clamping force will be reduced without appreciable separation of the plier-type clamps. The flash trimming cutters will be set to a position ensuring a minimum amount of flash remaining upon trimming.

A device embodying the features of the present invention comprises a d.c. adjustable speed electric motor 1 (FIG. 2) the output shaft 2 of which carries a worm 3 which is brought into engagement with a worm gear 4. The motor 1 is fixed on a machine stationary pillar (not shown but represented by cross-hatching designating ground). The worm gear 4 interacts with a screw-nut pair 5, 6. The screw 6 loaded with a spring 7 enters telescopically an axial hole in a rod 8 of a follow-up hydraulic slide valve 31 (FIG. 1). A body 9 of the follow-up or tracking slide valve communicates with a delivery manifold 12 through pipes 10 and 11 and also communicates with a drain manifold 13. Moreover, the follow-up slide valve body 9 is rigidly connected through pipe lines 14 and 15 to bodies 16 of both upset hydraulic cylinders (only one is shown in the drawings and designated by reference numeral 33).

The upset hydraulic cylinder bodies 16 are coupled with one pair of the plier-type clamps installed on the movable pillar 36 (to be described below in connection with FIG. 1), while upset cylinder rods 17 are connected to the other pair of the plier-type clamps installed on the other or stationary pillar (not shown in the figures), which other pillar is normally stationary by having the pair of jaws mounted thereon clamped to a rail fixed to the ground. Thus, for purposes of explanation, the pillar which remains clamped to one of the rails during the trimming operation and, therefore, does not move relative to the ground, shall be termed the stationary pillar or case. On the other hand, the other pillar on which the cutters are mounted and which is caused to move towards the joint during the trimming operation so that it moves relative to both the ground and the stationary pillar shall be referred to as the movable pillar. Of course, both pillars are actually movable in the sense that they are both transportable and may be moved from one location to another. However, only one of the pillars moves relative to the ground and to the rails during the trimming operation. The rod 8 of the follow-up slide valve 31 carries a spring 18 selected to bring a hydraulic follower drive 37 (31 and 33) comprising elements to be described below into a neutral position and assuring its reliable operation by stably positioning the rod 8 relative to the body 9 in accordance with well known design and operating principles.

Fixed on the body 9 of the follow-up slide valve 31 is a winding 19 of a control electromagnet 34 whose armature 20 is rigidly connected to the follow-up hydraulic slide valve rod 8.

During flashing the hydraulic follower drive 37 (31, 33) operates in a tracking mode in which it follows or tracks the electromechanical drive 32. Rotation of the electric motor 1 is converted through the worm 3, worm gear 4, nut 5, screw 6 and spring 7 into translatory motion of the rod 8. When the rod 8 is shifted to the left, the pipeline 15 is connected to the delivery manifold 12 and the pipeline 14 of the drain manifold 13, the body 16 of the upset cylinder thus being displaced to the left as well, following the corresponding displacement of the rod 8.

In the process of flash trimming contacts $P_1$ of the electrical control unit (35 in FIG. 1), such as an electrical timer of known construction, are closed in accordance with a preselected time program or sequence; the winding 19 of the control electromagnet 34 is energized and its armature 20 is pulled. Any conventional timer used for purposes of the type under consideration automatically includes a "preset program" since such timers include preselected cams and actuatable switches or contacts within the timer which are engaged by such cams to open and close the contacts in accordance with a desired sequence. Consequently, the rod 8 will move to the left, followed by the body 16 of the upset hydraulic cylinders 33 and the slide valve body 9. However, in this case no tracking will occur since the armature 20 remains pulled to the winding 19, the initial misalignment remaining throughout the trimming operation since the rod 8, which is rigidly coupled to the armature 20, continues to share the movements of the body 9. The spring 7 is adapted to offset the stroke of the rod 8 when no tracking action occurs during flash trimming, precluding therefore the breakage of the electromechanical drive elements 3, 4, 5 and 6.

Figure 2:
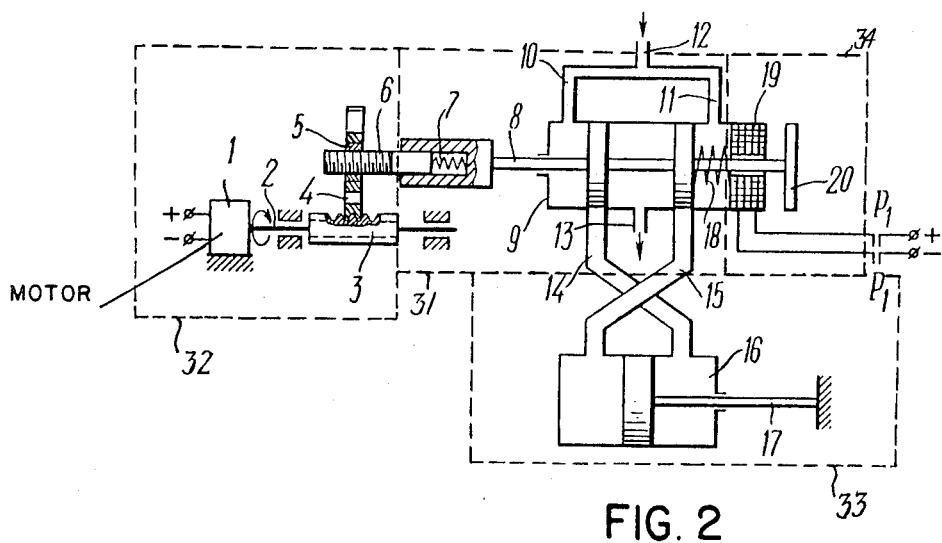
FIG. 2 shows the details of a part of device illustrated in FIG. 1, namely the electrohydraulic transfer drive and the trimming electromagnet circuit which are shown as blocks in FIG. 1.

FIG. 1 shows a block diagram of the proposed device and includes the electrohydraulic transfer drive 38 (31, 32, 33) and trimming electromagnet circuit 34 described above in relation to FIG. 2. The device includes a clamping cylinder 21 with a rod space 22 and a piston space 23, the cylinder 21 being coupled with clamping jaws 24. Connected to or mounted on the welding machine movable pillar 36 are the clamping jaws 24, the flash trimming blades 25, the body 16 of the upset hydraulic cylinder 33 (FIG. 2), and the body 9 of the follow-up hydraulic slide valve (FIG. 2). The stationary pillar (represented by the ground cross-hatchings) is generally similar in construction to the movable pillar 36. The cylinder 21 pressure equalizing hydraulic slide valve 26 cooperates with a control electromagnet 27. Moreover, provision is made for a manually or operator actuated reversing slide valve 28, a delivery manifold 29, a drain manifold 30, a follow-up hydraulic slide valve 31, an electromechanical drive 32 (elements 1–6 in FIG. 2), an upset hydraulic cylinder 33 (elements 14–17 in FIG. 2), an electromagnet 34 and an electrical control circuit 35 (which includes the contacts $P_1$ of FIG. 2) operating according to a preset time program.

The follow-up hydraulic slide valve 31 includes the rod 8 and the body 9 and also the springs 7 and 18 (FIG. 2). The electromechanical drive 32 comprises the d.c. motor 1, 2 and the speed reducer elements 3–6 (FIG. 2). The hydraulic follower drive 37 (31 and 33 in FIG. 1) comprises the upset hydraulic cylinder body 16 and the upset cylinder rod 17, and the follow-up hydraulic slide valve 31, rod 8 and body 9 (FIG. 2). The electromagnet 34 comprises the coil 19 and the armature 20 (FIG. 2). The electrical control circuit 35 comprises a conventional timer (not shown) having a plurality of contacts including contacts $P_1$ (FIG. 2), which is adapted to time a sequence of operations of the welder including welding and trimming and commences its timing operations at the beginning of the welding cycle. The aforementioned elements 31, 32, 33 and 35 are conventional and their construction, operation and cooperation with each other are well known in connection with the prior art plier-type welding machine described above. It should be understood, referring to FIG. 2, that the cross-hatching representing ground or earth also represents the stationary pillar to which the upset cylinder rod 17 and the electromechanical drive 32 of the transfer drive are connected.

In U.S. Pat. No. 3,349,216, there is described a plier-type welding apparatus and the relationships of the various elements thereof. FIGS. 2, 2a and 3 of that patent illustrate an operative connection between the clamping jaws 12, machine casings or pillars 1 and 2, the central stem 3 and the upset stems 4 and 5. FIGS. 3 and 4 of the patent illustrate interconnection between the electromechanical drive means 23, screw 22, upset electromagnets 21, hydraulic tracking valve 19, 20 and hydraulic cylinders 17 designed to drive a movable column of the machine. This patent, together with the above-identified Kuchuk-Yatsenko publication, describe the general principles of operation of the underlying resistance butt-welding machine, as well as describe the operation of the electromechanical drive identified by the reference numeral 32 in this application.

As noted above, U.S. Pat. No. 3,978,746 describes a scissor or plier-type resistance butt welding machine of the type under discussion and in connection with FIGS. 1–3 of that patent there is provided a description of cutters 7, 8 of a flash trimmer. Also described in the patent is the relationship of the trimmer with the clamps 9, 10. This patent also discloses the manner of operation of the machine with the cutters during clamping and unclamping of the rails to be welded.

In service the above-described device has the following distinguishing features. After a prescribed time period following upset, a command is sent by the control circuit or timer 35 to the electromagnet 27, the latter is energized, bringing the slide valve 26 into a position in which rod space 22 of the clamping cylinder 21 is shifted from the delivery manifold 29 to the drain manifold 30, whereupon the same pressure of several atmospheres, developed in the drain manifold, is attained in both spaces 22 and 23 of the clamping cylinder 21. Owing to the difference in the areas of the top and bottom portions of the piston of the cylinder 21, a resultant force is established that is directed upwards and makes the clamping jaws 24 installed on the machine movable pillar 36 separate slightly from the clamped rail. The flash trimming cutters 25 are also fixed on the machine movable pillar 36. An elastic deformation force arising in the machine elements upon clamping a rail in the machine jaws 24 also contributes to the release of the jaws. Under the effect of said forces the clamping jaws are brought apart providing a requisite clearance between the jaws 24 and the rail web. After a command issued by the control circuit 35 has been received by the electromagnet 34, the latter is energized, and actuates the rod of the follow-up hydraulic slide valve 31 which in turn actuates the upset hydraulic cylinder 33. The latter provides quick transfer by means of the upset cylinder body 16 of the movable pillar 36 together with the released jaws 24 and cutters 25 towards the stationary pillar (not shown), cutting off flash and upset metal squeezed from the joint. The length of the transfer being equal to the entire stroke of the machine. The rail clamped by the other pair of the clamping jaws on the machine stationary pillar is not released. Thus, the slide valve 31 is actuated, on one side, by the electromechanical drive 32 and, on the other side, by the electromagnet 34.

The herein proposed device can be mounted on the prior art plier or scissor-type butt welder and will ensure in combination with the blades set up on one pair of the plier-type clamps, the trimming of flash from the welded joint. This would require minimal changes in the welder design per se but make it possible to utilize said prior art machine not only for welding parts together but for flash trimming. In this case there is no longer the need for manual shearing off the flashes by air chisels, which is a labor-consuming and insufficiently mechanized operation, or for using separate flash trimming gears of sophisticated design. The present invention has added the flash trimming blades or cutters 25, the changeover hydraulic slide valve 26, the electromagnets 27 and 34 which, in FIG. 2, are partially represented by the winding or coil 19 and the armature 20. In the prior art machine, the rod space 22 was connected to the delivery manifold 29 or drain manifold 30 through the reversing slide valve 28. Now, the connections are different and include the changeover hydraulic slide valve 26, through which the rod space 22 can be connected to the piston space 23. Thus, with few inexpensive modifications or changes in the design of the prior art plier butt welding machines offer an increase in the production rates, provide for better quality of welding operations and improve working conditions.

What is claimed is:

1. In a butt welding machine of the type having two pairs of plier or scissor-type clamps and upset hydraulic cylinders coupled with said plier-type clamps, each of said two pairs of plier-type clamps having a hydraulic cylinder for clamping machine jaws against parts to be welded, a hydraulic fluid supply system with delivery and drain manifolds connected to the spaces of a reversing hydraulic slide valve for simultaneously controlling the clamping and unclamping of both welded parts by controlling the hydraulic pressures within the spaces of said clamping hydraulic cylinders, a follow-up hydraulic slide valve connected to said manifolds and to said upset hydraulic cylinders and controlling coupling between said upset hydraulic cylinders and said manifolds to thereby control said upset hydraulic cylinders, and an electromechanical drive coupled to said follow-up hydraulic slide valve for actuating the same and thereby actuating said upset hydraulic cylinders during the welding process, said electromechanical drive, said follow-up hydraulic slide valve and said upset hydraulic cylinders together forming an electrohydraulic transfer drive; a device for flash trimming, following upset, comprising flash trimming cutters mounted on one of said pairs of said plier-type clamps to thereby move jointly therewith, and means for controlling the machine following upset and during flash trimming which comprises a multiposition switch means coupled to said drain manifold and disposed between said reversing hydraulic slide valve and the rod space of that clamping hydraulic cylinder which is associated with a pair of said plier-type clamps fitted with flash trimming cutters so that in one of the positions said switch means substantially equalizes the pressures in both the rod and piston spaces of the respective clamping hydraulic cylinder, this resulting in a slight displacement of the rod of said clamping hydraulic cylinder and relieving one of the welded parts from the clamping force.

2. A device as defined in claim 1, wherein said multiposition switch means comprises a pressure equalizing hydraulic slide valve.

3. A device as defined in claim 2, wherein following upset said reversing hydraulic slide valve connects said piston space of said clamping hydraulic cylinders to said drain manifold, and wherein said pressure equalizing hydraulic slide valve is adapted to connect said rod space of said respective clamping hydraulic cylinder to said drain manifold.

4. A device as defined in claim 3, further comprising actuating means for actuating said pressure equalizing hydraulic slide valve following upset.

5. A device as defined in claim 4, wherein said actuating means includes an electromagnet connected to said pressure equalizing hydraulic slice valve.

6. A device as defined in claim 3, further comprising actuating means for actuating said follow-up slide valve during the flash trimming step.

7. A device as defined in claim 6, wherein said actuating means includes an electromagnet connected to said follow-up slide valve.

8. A device as defined in claim 2, further comprising actuating means for respectively actuating said pressure equalizing hydraulic slide valve and said follow-up slide valve, and electrical control means for energizing said actuating means according to a predetermined program.

9. A device as defined in claim 8, wherein said electrical control means comprises a master timer.

10. A device as defined in claim 1, wherein the welding machine is portable and has a plurality of pillars, and said plier-type clamps form part of said pillars.

* * * * *